Figure 1:
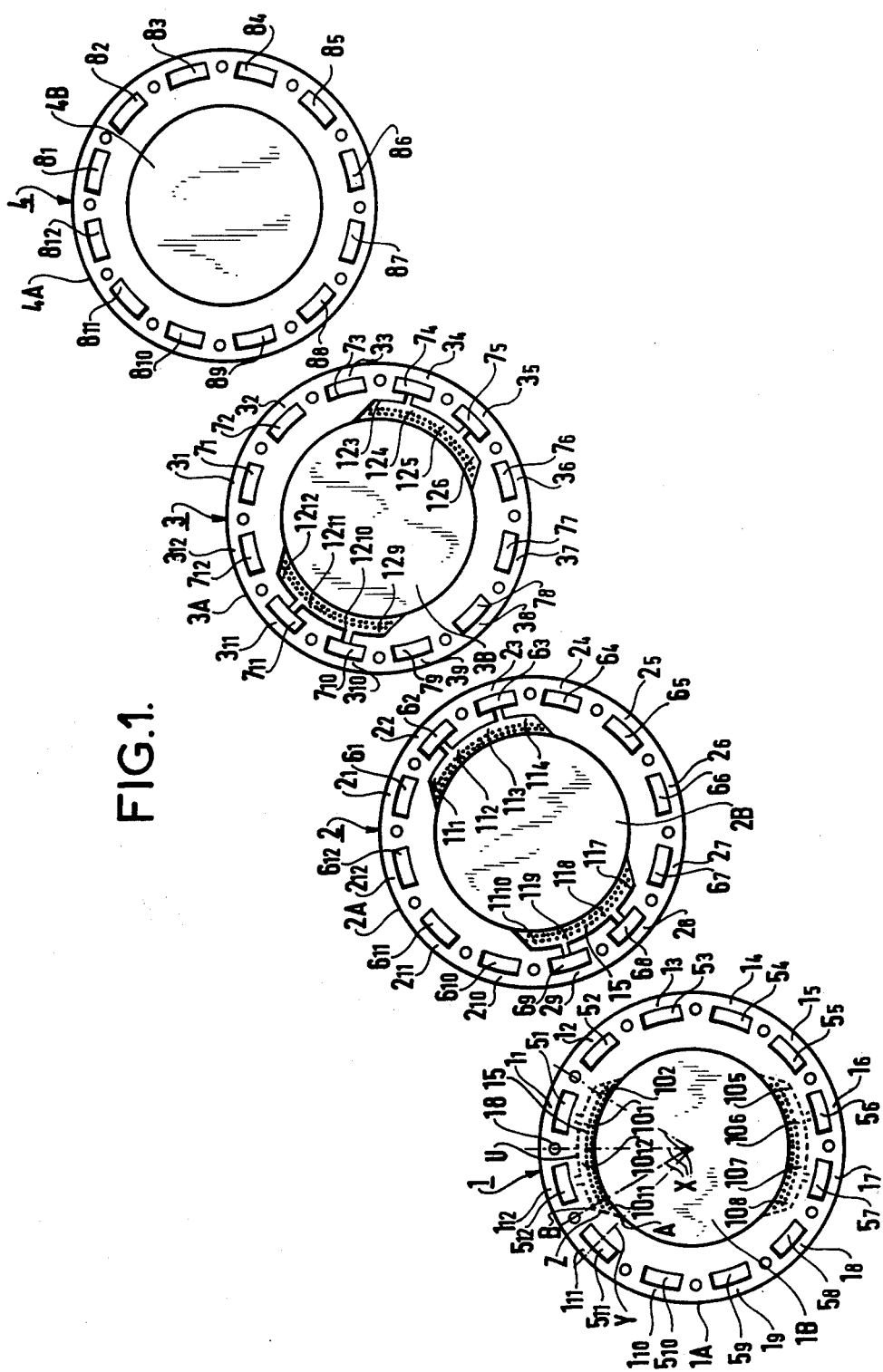

United States Patent [19]

Regnaut

[11] 4,048,385

[45] Sept. 13, 1977

[54] CROSS-FEED FUEL CELL BATTERY WITH FILTER PRESS TYPE STRUCTURE OF CYLINDRICAL CROSS-SECTION

[75] Inventor: Bernard Regnaut, Antony, France

[73] Assignee: Societe Generale de Constructions Electriques et Mecaniques "Alsthom et Cie", Paris, France

[21] Appl. No.: 654,727

[22] Filed: Feb. 2, 1976

[30] Foreign Application Priority Data

Feb. 6, 1975 France .................................. 75.03664

[51] Int. Cl.$^2$ .......................................... H01M 8/24
[52] U.S. Cl. ...................................................... 429/34
[58] Field of Search ....................... 429/14, 18, 34–40, 429/72

[56] References Cited

U.S. PATENT DOCUMENTS

| 2,969,315 | 1/1961 | Bacon ....................................... 429/34 |
| 3,188,242 | 6/1965 | Kordesah et al. ....................... 429/38 |
| 3,814,631 | 6/1974 | Warszawski et al. .................. 429/39 |

Primary Examiner—T. Tung
Assistant Examiner—H. A. Feeley
Attorney, Agent, or Firm—William R. Woodward

[57] ABSTRACT

The component plates stacked in a filter press type structure in a repeated sequence of cathode, separator, anode and conductive plate are of cylindrical shape with an outer frame carrying the channels for supplying and withdrawing the reagents. Hollowed-out inlet and outlet portions communicating with appropriate channels pressing through the frames are provided for passing the reagents across the active portions of the components at a desired cross-feed angle between adjacent units, 30° in one case and 60° in another.

9 Claims, 3 Drawing Figures

CROSS-FEED FUEL CELL BATTERY WITH FILTER PRESS TYPE STRUCTURE OF CYLINDRICAL CROSS-SECTION

This invention relates to fuel cells and particularly to fuel cell batteries of a structure similar to that of a filter press in which reagents, namely, the fuel, the material supporting combustion and the electrolyte have a cross-flow at an angle to each other.

Fuel cell batteries of a filter press type of structure are well known. Such a structure is formed by stacking, repetitively, an elementary sequence of components of plate form, for example, a cathode and an anode separated by a separator or diaphragm. One of the faces of the cathode and of the anode are being supplied respectively with the material supporting combustion and with the fuel, while the other face of both these electrodes is supplied with the electrolyte, all of these components being tightened one against the other by some appropriate means.

In these known types of fuel cell batteries, each of the components is in the form having a frame of square or rectangular shape made of a plastic (i.e. synthetic resin material), in which a central active portion is enclosed or held, the active portion being a catalytic material in the case of the electrodes and of an electrolyte-permeable insulating material in the case of the separator. These frames are pierced at their upper lower portion by openings which constitute, when the frames are tightened one against the other, supply conduits for the reagents and discharge conduits for the products resulting from the electrochemical process, these openings being made to communicate with the active central part of the appropriate components by means of appropriate microchannels.

It is an object of the present invention to provide a fuel cell battery of simple and readily constructed form in which there is a cross-feed of reagents which will be well suited to the cross-feeding of three different reagents.

SUMMARY OF THE INVENTION

Briefly, the filter press structure is made in cylindrical form and the fuel cell battery is formed of an assembly of cylindrical flat plates stacked according to a repeated elementary sequence of cathode, separator, anode and current collector, each of the components, of course, having substantially the same contour and being in the form of thin plates composed of a frame of electrically insulating material holding and surrounding an active central portion, the faces of the active central portions of the cathode and the anode which do not face the separator being irrigated respectively by the material supporting combustion and by the fuel, while the other faces of these active portions and the two faces of the central portion of the separator are irrigated by the electrolyte. As already mentioned, this fuel cell battery is distinguished by the fact that the plates are circular, so that their frame portions have an exterior circular perimeter and an inner circular boundary, the circles naturally being concentric. The frames are pierced each by duct openings, in addition to any smaller openings necessary for fastening the plates together, evenly spaced around the circumference. In the case of 12 duct openings, the frames may be regarded as made up of twelve sectors of 30° of arc and the openings of corresponding sectors of the various frames are of the same shape, so that when the frames are assembled in filter press structure 12 channels running parallel to the axis of the structure will be formed constituting six pairs of channels, the two channels of each pair serving the same purpose. A first pair of these provides the supply of combustion supporting material to the cathode, a second provides the supply of electrolyte to the separator, a third provides the supply of fuel to the anode, a fourth provides the removal of the used combustion supporting material, a fifth provides the removal of the electrolyte and a sixth pair of openings provides for the removal of the reaction products of the fuel, the pairs of openings being so disposed around the circumference that the average direction of flow of one reagent across the component to which it is specific as aforesaid makes a predetermined acute angle to the average direction of flow of the reagent flowing across the neighboring component. Of course, the electrolyte is caused to flow across both faces of the separator, whereas the fuel and the combustion supporting material flow across the faces of the cathode and anode, respectively, which are turned away form the separator.

When each pair of channels serving one function is made up of adjacent channels, the angle between the reagent flow in adjacent components of one cell is 60°. That angle can be made 30° by pairing channels separated by two other channels serving other functions, assuming of course a 12 channel design.

Figure 2:
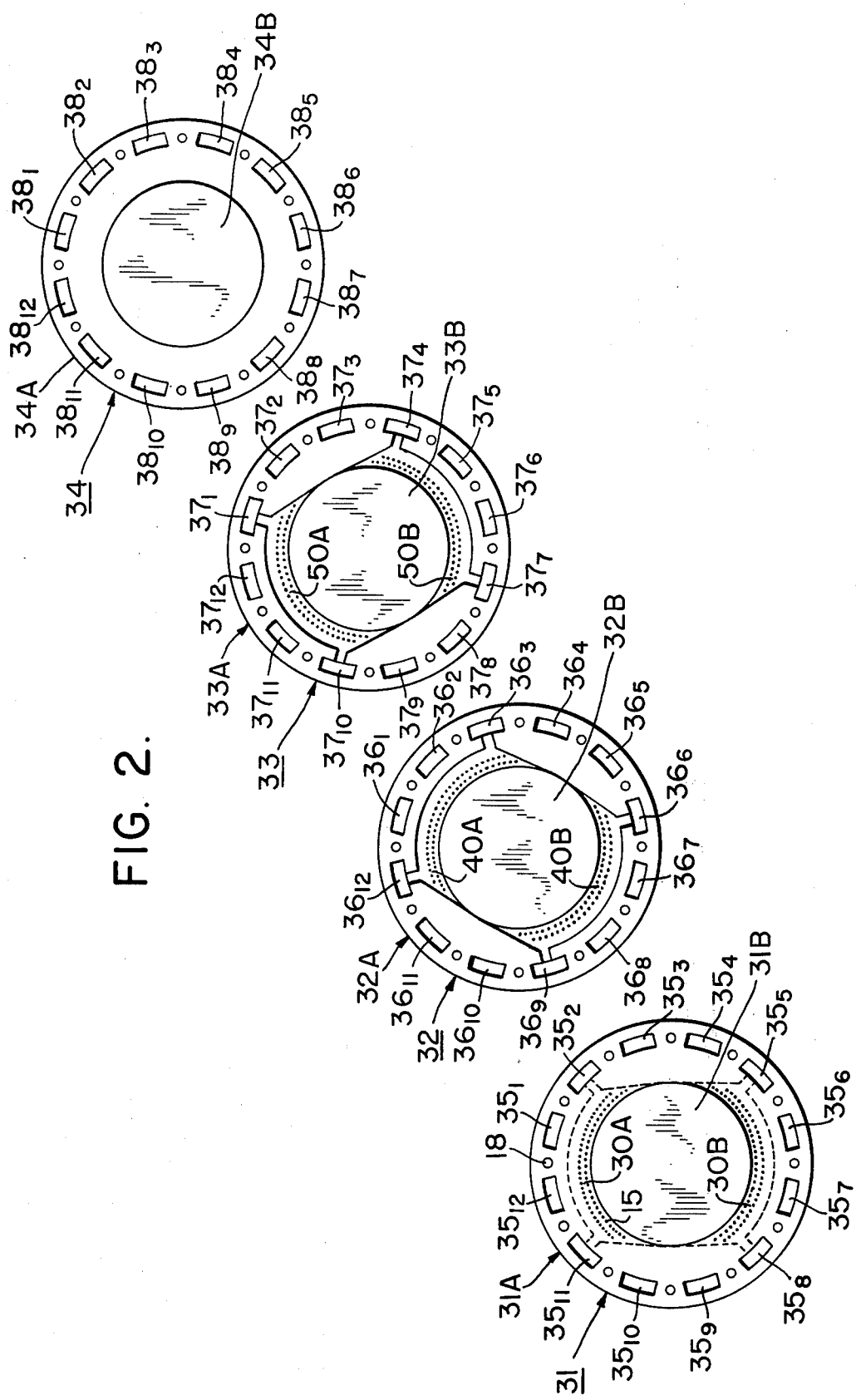
Figure 3:
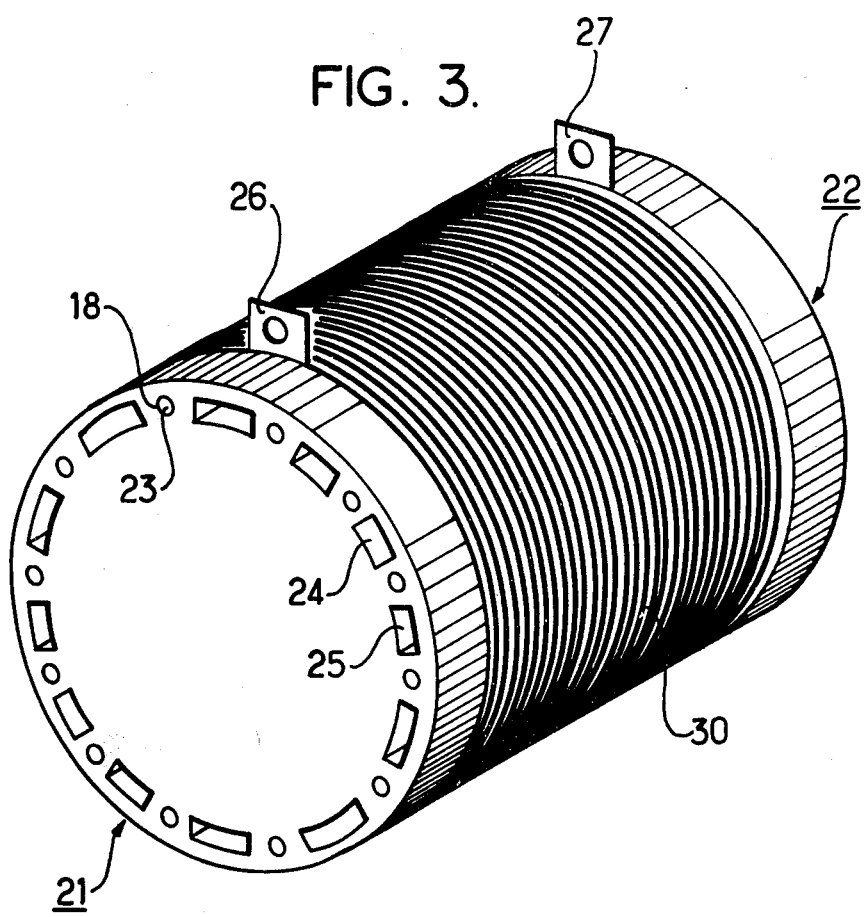

The invention is further described by way of example with reference to the accompanying drawings, in which:

FIG. 1 is an exploded view of one cell of a fuel cell battery according to the invention so that each plate of one elementary cell sequence of components can be seen face on, FIG. 2 is an exploded view of another form of elementary cell sequence of a fuel cell battery according to the invention, and FIG. 3 is a perspective view of an assembly of components, such as those of FIG. 1 or those of FIG. 2, in a fuel cell battery according to the invention.

As shown in FIG. 1, the elementary cell sequence of components of a fuel cell battery according to the invention consists of a cathode 1, a separator 2, an anode 3 and a current collector 4, this last serving to pass on the electrons towards another cathode (not shown) and so on. These components are in the form of thin plates of circular contour of the same diameter, each composed of a frame that is circular both on the outside and on the inside, the frame encircling and holding a central active portion, any further detail of which is not shown in the figure.

Thus, the cathode 1 is formed of a frame 1A encircling a central active portion 1B which carries a catalyst specific for the fuel, for example in the case of a hydrogen fuel, a carbon catalyst. Similarly, the separator 2 is composed of a frame 2A encircling a central portion 2B that is electrically insulating but with very fine pores, as for example paper impregnated by an epoxide resin, and this active portion is arranged to be irrigated by an electrolyte such as potassium hydroxide solution of a concentration, preferably between 28 and 168g/l by weight. The anode 3 is formed of a frame 3A encircling a central active portion 3B carrying a catalyst specific for the combustion supporting material, which, when air is the combustion supporting material, is preferably nickel or a metal of the platinum group, such as platinum, palladium, osmium or irridium. The collector 4 is composed of a frame 4A encircling a central portion 4B made of a conducting metal, for example nickel.

Each of the component frames has 12 rectangular holes pierced through it in a direction parallel to the axis of the structure, in this case all being of the same dimensions and evenly distributed around the circumference of the frame. Consequently, the frame may be regarded as made up of 12 sectors each of 30° of arc and each having one of these rectangular holes, for example the sector $1_1$ of the frame 1A of the cathode 1 having the opening $5_1$ and being bounded by radii X diverging at an angle of 30° from the center of the structure and by the aforesaid two concentric circles. In addition to the rectangular openings already mentioned, small bores are provided, in the illustrated case one between each adjacent pair of rectangular holes, through which the fastening means may be provided for tightening the various component frames together into a filter press structure. Clamping bolts or the like may be used for that purpose. As is evident from the drawings, the frames of the other components have characteristics similar to those described for the cathode component 1.

When the various components are tightened together one against the other by tightening bolts (not shown) passing through the bores 18, the various rectangular openings in the frames are in register and form channels for supply and removal of the reagents as will now be described below. Examination of FIG. 1 will show that the average direction of flow of a reagent across the active portion of one component makes an angle of about 60° with that of the neighboring reagent flow. The flow is provided by inlets and outlets in the frames connecting the rectangular openings with the space adjacent the active portions of the components as further set forth below, these inlets and outlets being in the form of portions recessed or hollowed out, for example in the form of a rabbet or step, on the interior of the frame in question.

As shown in FIG. 1, the sectors $1_{11},1_{12},1_1$ and $1_2$ of the frame 1A of the cathode 1 have, on one of the faces of this frame, in the illustrated case the face visible in FIG. 1, hollowed-out portions $10_{11},10_{12},10_1$ and $10_2$. The hollowed-out portions $10_{12}$ and $10_1$ are each bounded by the aforesaid radii X defining the corresponding sector, by the interior circle bounding the frame and by an arc U of a radius approximately equal to the mean of the radii of the interior and exterior circles bounding the frame, while the hollowed-out portions $10_{11}$ and $10_2$ are each bounded by a radius X, the interior circle and a straight line Z substantially joining the intersection A of the interior circle with the median Y of the sector in question and running to a point B on the said radius X approximately equidistant from the interior and exterior circles bounding the frames. The hollowed-out portions just described communicate completely with each other, but only the hollowed-out portions $10_{12}$ and $10_1$ are connected with the openings $5_{12}$ and $5_1$ respectively, of their corresponding sectors of the frame.

On the other hand, the sectors diammetrically opposite to the sectors $1_{11},1_{11},1_1$ and $1_2$, which is to say the sectors $1_5,1_6,1_7$ and $1_8$ are likewise provided with hollowed-out portions similar to those just described, namely the hollowed-out portions $10_5,10_6,10_7$ and $10_8$.

These hollowed-out portions and, likewise, the hollowed-out portions of the other components are provided with pins such as the pin 15, in an array serving to promote distribution of the flow of reagent to and from the active portion of the component in question.

Likewise, the sectors $2_1,2_2,2_3$ and $2_4$ on the one hand, and $2_7,2_8,2_9$ and $2_{10}$ on the other, are provided on both faces of the frame 2A of the separator 2 with hollowed-out portions $11_1,11_2,11_3$ and $11_4$ which communicate with each other on the one hand, and $11_7,11_8,11_9$ and $11_{10}$ which communicate with each other on the other hand.

The hollowed-out portions $11_2$ and $11_3$ communicate with the openings $6_2$ and $6_3$, whereas the hollowed-out portions $11_8$ and $11_9$ communicate with the openings $6_8$ and $6_9$ respectively.

In a similar fashion, the sectors $3_3,3_4,3_5$ and $3_6$ on one hand, and $3_9,3_{10},3_{11}$ and $3_{12}$ on the other, are provided on the face of the anode 3 that faces the collector 4 with hollowed-out portions respectively $12_3, 12_4,12_5$ and $12_6$ communicating with each other, and $12_9, 12_{10},12_{11}$ and $12_{12}$ likewise communicating with each other. The hollowed-out portions $12_4$ and $12_5$ communicate with the openings $7_4$ and $7_5$, while the hollowed-out portions $12_{10}$ and $12_{11}$ communicate with the openings $7_{10}$ and $7_{11}$ respectively.

The collector 4, however, has no inlet or outlet hollowings on its frame.

Thus, when components as above described are tightened together one against the other so as to form a filter press type of structure, twelve channels are provided by registry of the various openings of the various components.

Firstly, the openings $5_2,6_2, 7_2$ and $8_2$ on one hand, and $5_3,6_3,7_3$ and $8_3$ on the other, form two channels for supplying the electrolyte on both faces of the central portion 2B of the separator 2 by way of the hollowed-out portions $11_1, 11_2,11_3$ and $11_4$ provided on both sides of the separator frame.

Secondly, the openings $5_{12},6_{12},7_{12}$ and $8_{12}$ on one hand, and $5_1,6_1,7_1$ and $8_1$ on the other, form two channels supplying the combustion supporting materials to the active portion 1B of the face of the cathode 1 which is visible in the figure, by way of the hollowed-out portions $10_{11},10_{12}, 10$ and $10_2$ provided on that face of the cathode frame.

Thirdly, the openings $5_4,6_4,7_4$ and $8_4$ on one hand, and $5_5,6_5,7_5$ and $8_5$ on the other, form two channels for removing the oxidation products of the fuel from the face of the active portion 3B of the anode 3 which is not visible on the figure, by way of the hollowed-out portions $12_3,12_4,12_5$ and $12_6$ of the frame of the anode 3.

Fourthly, the openings $5_8,6_8,7_8$ and $8_8$ on one hand, and $5_9,6_9,7_9$ and $8_9$ on the other, form two channels for removing the electrolyte after irrigation of both faces of the central active portion 2B of the separator 2, by way of the hollowed-out portions $11_7,11_8,11_9$ and $11_{10}$ provided on both sides of the frame of the separator 2.

Fifthly, the openings $5_6,6_6,7_6$ and $8_6$ on one hand, and $5_7,6_7,7_7$ and $8_7$ on the other, form two channels for removing the used combustion supporting material from the active portion 1B of the face of the cathode 1 which is visible on the figure, by way of the hollowed-out portions $10_5,10_6,10_7$ and $10_8$.

Sixthly, the openings $5_{10},6_{10},7_{10}$ and $8_{10}$ on one hand, and $5_{11},6_{11},7_{11}$ and $8_{11}$ on the other, form two channels for supplying fuel to the face of the active portion 3B of the anode 3 which is not visible on the figure, by way of the hollowed-out portions $12_3,12_4,12_5$ and $12_6$.

FIG. 2 shows the elementary sequence of components of a fuel cell battery according to the invention which is of a design such that the angle between the reagent flow in two adjacent components of the same cell will be 30° instead of 60°. As before, the elementary cell sequence of components consists of a cathode 31, a separator 32, an anode 33 and a current collector 34, this last serving to pass on the electrons towards another cathode of the battery (not shown), and so on. These components are made in the same way as those of FIG. 1 except for the arrangement of the connections between the channels and the active portions of the components.

Thus, the cathode 31 is formed of a frame 31A encircling a central active portion 31B which carries a catalyst specific for the fuel, for example in the case of a hydrogen fuel, a carbon catalyst. Similarly the separator 32 is composed of a frame 32A encircling a central portion 32B that is electrically insulating but with very fine pores, as for example paper impregnated by an epoxide resin, and this active portion is arranged to be irrigated by an electrolyte such as potassium hydroxide solution. The anode 33 is formed of a frame 33A encircling a central active portion 33B carrying a catalyst specific for the combustion supporting material, which in the case of air is preferably nickel or a metal of the platinum group such as platinum, palladium, osmium or iridium. The collector 34 is composed of a frame 34A encircling a central portion 34B made of a conducting metal, for example nickel.

Each of the component frames has twelve rectangular or substantially rectangular holes pierced through it in a direction parallel to the axis of the structure, again illustrated as all being of the same dimensions and evenly distributed around the circumference of the frame. In addition, between these holes small bores are provided such as the bore 18 for allowing the passage of fastening rods to hold and tighten the whole structure together.

When the various components are tightened together one against the other, the various rectangular openings come into register and form channels for supply and removal of the reagents. In the case of FIG. 2, each pair of channels that supplies or removes a reagent is made up of two channels that are separated in circumferential sequence by two other channels each belonging to a different reagent supply or removal pair. Hollowed-out portions are provided on each of the frames communicating respectively with the pairs of channels respectively supplying and removing reagent in the particular component.

In the first place, the openings $35_{12}$, $36_{12}$, $37_{12}$ and $38_{12}$ on the one hand and $35_3$, $36_3$, $37_3$ and $38_3$ on the other form two channels for supplying the electrolyte on both faces of the central portion 32B of the separator 32 by way of the hollowed-out portion 40A which is provided on both sides of the separator frame 32A, communicating in each case with the openings $36_{12}$ and $36_3$ of the frame 32A.

Secondly, the openings $35_{11}$, $36_{11}$, $37_{11}$ and $38_{11}$ on one hand and $35_2$, $36_2$, $37_2$ and $38_2$ on the other form two channels supplying the combustion supporting material to the active portion 31B of the face of the cathode 31 which is visible in the figure, by way of the hollowed-out portion 30A provided on the frame 31A of the cathode 31 and communicating with the openings $35_{11}$ and $35_2$ thereof.

Thirdly, the openings $35_7$, $36_7$, $37_7$ and $38_7$ on the one hand and $35_4$, $36_4$, $37_4$ and $38_4$ on the other form two channels for removing the oxidation products of the fuel from the face of the active portion 33B of the anode 33 which is not visible in the figure, by way of the hollowed-out portion 50B on that side of the frame 33A of the anode 33.

Fourthly, the openings $35_9$, $36_9$, $37_9$ and $38_9$ on one hand and $35_6$, $36_6$, $37_6$ and $38_6$ on the other form two channels for removing the electrolyte after irrigation of both faces of the central active portion 32B of the separator 32 by way of the hollowed-out portion 40B provided on both sides of the frame 32A of the separator 32.

Fifthly, the openings $35_8$, $36_8$, $37_8$ and $38_8$ on one hand and $35_5$, $36_5$, $37_5$ and $38_5$ on the other form two channels for removing the used combustion supporting material from the active portion 31B of the face of the cathode 31 which is visible on the figure by way of the hollowed-out portion 30B of the frame 31A of the cathode 31.

Sixthly, the openings $35_{10}$, $36_{10}$, $37_{10}$ and $38_{10}$ on one hand and $35_1$, $36_1$, $37_1$ and $38_1$ on the other form two channels for supplying fuel to the face of the active portion 33B of the anode 33 which is not visible in the figure, by way of the hollowed-out portion 50A on that side of the frame 33A of the anode 33.

It will be seen from this arrangement, and particularly from the disposition of the hollowed-out portions 30A and 30B of the cathode, 40A and 40B of the separator and 50A and 50B of the anode as shown in FIG. 2 that the angle between the respective average directions of flow of the reagents in two adjacent components of the same cell is substantially 30°.

FIG. 3 is a perspective (isometric) view of an assembly of components in a fuel cell battery in accordance with the present invention. The reference numeral 30 indicates the stacked components which are of course in the sequence indicated in FIG. 1 and FIG. 2 and may be either of the type shown in FIG. 1 or of the type shown in FIG. 2, stacked in a repeating sequence. Terminals 26 and 27 are provided for making available the electromotive force of the battery and delivering the current generated in it. The components 30 are tightened and held together between the end plates 21 and 22 by tension members 23 passing through the round holes 18. The end plate 21 is provided with rectangular or substantially rectangular openings such as the openings 24 and 25 which are in registry with the openings of the components 30, so that the reagents may be supplied and withdrawn through the end plate. If desired, the end plate 22 may be provided with similar openings so that supply and withdrawal of the reagents may be made through both end plates at the same time or, if desired, one of the end plates may be provided only with the openings necessary for supply of reagents and the other only with the openings necessary for removal of reagents.

It is thus seen that a fuel cell battery according to the invention is made up of components that are identical in contour and, preferably, also in thickness and that, accordingly, the frames for all these components can readily be made by any means of shaping synthetic resin material. In consequence, such a battery is readily made on an industrial scale. Furthermore, the cross-feed system provides a better irrigation of the active surfaces of the electrodes. As a practical example of a battery according to the invention, there may be mentioned a battery of twenty cells manufactured by the owner of the present application, each cell made up of components such as those just described. The active portions of the components have a cross-sectional area of 100 cm$^2$. Such a battery delivers an e.m.f. of 0.8 volts per cell, therefore 16 volts altogether, and is capable of delivering a total power of at least 160 watts. In this particular battery, the fuel was hydrogen, and the combustion supporting material was air.

Although the invention has been described with reference to particular illustrative examples, it is not strictly limited thereto and variations and modifications, particularly substituting of equivalents, may be made within the inventive concept.

I claim:

1. A fuel cell battery formed of an assembly comprising plate-like components in a repeating order of sequence combining the elementary sequence of a cathode, a separator, an anode and a collector, each of said components having substantially the same contour and being in the form of thin plates each having a frame of an electrically insulating material surrounding a central active portion, the respective faces of the respective active portions of the cathode and anode components which face away from the separator component being respectively irrigated by the combustion supporting material and by the fuel, and the two faces of the separator component being irrigated by the electrolyte, said fuel cell being characterized by the improvement wherein:

said frames are of circular contour and are bounded by concentric circles, so that each frame is constituted in the shape of a flat annulus made up of 12 successively contiguous sectors of 30° of arc, and each of said sectors is pierced in the axial direction by an opening of a particular shape which is the same in the same sector of each of said frames, when the components and their frame are assembled, the openings in each sector are in registry so that six pairs of channels are provided, of which a first pair provides the supply of the combustion supporting material to the cathode (1), a second pair the supply of electrolyte for irrigating both sides of the separator (2), a third pair the supply of fuel to the anode (3), a fourth pair the removal of the used combustion supporting material, a fifth pair the removal of the electrolyte and a sixth pair the removal of the reaction products of the fuel, branch channels are provided by recessed portions of each cathode component frame connecting said first and fourth pairs of channels with the side of said active portion of said cathode component which faces away from the adjacent separator component;

branch channels are provided by recessed portions of each anode component frame connecting said third and sixth pairs of channels with the side of said active portion of said anode component which faces away from the adjacent separator component;

branch channels are provided by recessed portions of each separator component frame connecting said second and fifth channels with both sides of said active portion of said separator component, and said channels and branch channels are so disposed that the average direction of flow of said electrolyte from said second to said fifth pair of channels across the faces of the separator active portion is at the same predetermined acute angle to the respective average directions of flow of said fuel, from said third to said sixth pair of channels, and of said combustion supporting material, from said first to said fourth pair of channels, across the active portions respectively of said anode and cathode components of the same cell.

2. A fuel cell battery as defined in claim 1 in which said pairs of channels are pairs of adjacent channels and in which said predetermined angle between average directions of flow in adjacent components of a cell is substantially 60°.

3. A fuel cell battery as defined in claim 2, in which each of the frames of the cathode, separator and anode components has diametrically opposed recessed portions, providing said branch channels, each of which recessed portions extends over at least two adjacent sectors in which, in each case, one of said pairs of adjacent channel openings is located, said recessed portions communicating with said pair of openings, and in which, further, said recessed portions are provided on both sides of said separator frames and on one side of said cathode and anode frames.

4. A fuel cell battery as defined in claim 3, in which each of said recessed portions is bounded, at its edge nearer said openings, by an arc concentric with the concentric circles defining the frame and located in the mid-portion of said frame, extending across said two adjacent sectors and is also bounded by straight lines joining the end of said arc with the intersection of the median of the next adjacent section and the innermost of said concentric circles at the inner boundary of said frame.

5. A fuel cell battery as defined in claim 3, in which each of said recessed portions of said frames is provided in its portion adjacent said central active portion of the component framed by the respective frame with an array of obstructing pins arranged so as to improve the distribution of the flow of reagent across said active portion.

6. A fuel cell battery as defined in claim 1, in which said fuel is selected from the group consisting of hydrogen, hydrocarbons and alcohols and said combustion supporting material is selected from the group consisting of oxygen, air and other mixtures of oxygen and substantially inert gases.

7. A fuel cell battery as defined in claim 1, in which the channels of each of said pairs of channels are separated by two other channels, each belonging to a different pair of said pairs of channels, and in which, accordingly, said predetermined angle between average directions of flow in adjacent components of a cell is 30°.

8. A fuel cell battery as defined in claim 7, in which the frames of said cathode, anode and separator components have diametrically opposite recessed portions respectively communicating with diametrically opposed pairs of said channels for assisting reagent flow across the active portion of the respective components in an evenly distributed manner, said recessed portions being provided on both sides of said separator components and on one side of said cathode and of said anode components.

9. A fuel cell battery as defined in claim 5, in which each of said recessed portions of said frames is provided in its portion adjacent said central active portion of the component framed by the respective frame with an array of obstructing pins arranged so as to improve the distribution of the flow of reagent across said active portion.

* * * * *